(12) United States Patent
Hooker et al.

(10) Patent No.: US 9,569,363 B2
(45) Date of Patent: *Feb. 14, 2017

(54) SELECTIVE PREFETCHING OF PHYSICALLY SEQUENTIAL CACHE LINE TO CACHE LINE THAT INCLUDES LOADED PAGE TABLE ENTRY

(71) Applicant: VIA TECHNOLOGIES, INC., New Taipei (TW)

(72) Inventors: Rodney E. Hooker, Austin, TX (US); Colin Eddy, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,467

(22) Filed: Jul. 2, 2015

(65) Prior Publication Data
US 2015/0309936 A1    Oct. 29, 2015

Related U.S. Application Data

(63) Continuation-in-part of application No. 13/872,527, filed on Apr. 29, 2013, now abandoned, which is a
(Continued)

(51) Int. Cl.
G06F 12/08    (2016.01)
G06F 12/10    (2016.01)

(52) U.S. Cl.
CPC ........... G06F 12/0862 (2013.01); G06F 12/10 (2013.01); G06F 12/1027 (2013.01);
(Continued)

(58) Field of Classification Search
CPC ............... G06F 12/0862; G06F 2212/1024; G06F 2212/251; G06F 2212/6022
See application file for complete search history.

(56) References Cited

U.S. PATENT DOCUMENTS 5,613,083 A    3/1997 Glew et al.
5,666,509 A    9/1997 McCarthy et al.
(Continued)

OTHER PUBLICATIONS

Bala, Kavita et al., "Software Prefetching and Caching for Translation Lookaside Buffers." Downloaded on Mar. 11, 2009 from https://eprints.kfupm.edu.sa/65603/1/65603.pdf pp. 1-11.
(Continued)

Primary Examiner — Reginald Bragdon
Assistant Examiner — Mehdi Namazi
(74) Attorney, Agent, or Firm — E. Alan Davis; James W. Huffman

(57) ABSTRACT

A microprocessor includes a translation lookaside buffer and a first request to load into the microprocessor a page table entry in response to a miss of a virtual address in the translation lookaside buffer. The requested page table entry is included in a page table. The page table encompasses a plurality of cache lines including a first cache line that includes the requested page table entry. The microprocessor also includes hardware logic that makes a determination whether a second cache line physically sequential to the first cache line is outside the page table, and a second request to prefetch the second cache line into the microprocessor. The second request is selectively generated based at least on the determination made by the hardware logic.

21 Claims, 11 Drawing Sheets

Related U.S. Application Data continuation of application No. 13/412,934, filed on Mar. 6, 2012, now Pat. No. 8,433,853, which is a continuation of application No. 12/604,998, filed on Oct. 23, 2009, now Pat. No. 8,161,246.

(60) Provisional application No. 61/164,588, filed on Mar. 30, 2009.

(52) U.S. Cl.
CPC ............... *G06F 2212/1024* (2013.01); *G06F 2212/251* (2013.01); *G06F 2212/6022* (2013.01); *G06F 2212/6028* (2013.01)

(56) References Cited

U.S. PATENT DOCUMENTS

| | | |
|---|---|---|
| 5,752,274 A | 5/1998 | Garibay et al. |
| 5,963,984 A | 10/1999 | Garibay et al. |
| 6,681,311 B2 | 1/2004 | Gaskins et al. |
| 7,409,524 B2 | 8/2008 | Safford et al. |
| 7,480,769 B2 | 1/2009 | Diefendorff et al. |
| 8,161,246 B2 | 4/2012 | Hooker et al. |
| 2006/0047915 A1 | 3/2006 | Janik et al. |
| 2006/0136696 A1 | 6/2006 | Grayson |
| 2006/0265552 A1 | 11/2006 | Davis et al. |
| 2007/0283123 A1 | 12/2007 | Vick et al. |
| 2008/0155226 A1 | 6/2008 | Davis et al. |
| 2008/0276067 A1* | 11/2008 | Chen ............... G06F 12/1027 711/206 |
| 2009/0006762 A1 | 1/2009 | Gara et al. |
| 2009/0013149 A1 | 1/2009 | Uhlig et al. |
| 2009/0019254 A1 | 1/2009 | Stecher |
| 2009/0198907 A1 | 8/2009 | Speight et al. |
| 2010/0011188 A1 | 1/2010 | Eddy et al. |
| 2010/0036987 A1 | 2/2010 | Streett et al. |
| 2010/0235586 A1* | 9/2010 | Gonion ............ G06F 12/0831 711/144 |
| 2011/0145509 A1 | 6/2011 | Speight et al. |
| 2012/0198176 A1 | 8/2012 | Hooker et al. |
| 2014/0013058 A1 | 1/2014 | Hooker et al. |

OTHER PUBLICATIONS

Sarda, Parag et al., "Evaluation of TLB Prefetching Techniques." Downloaded on Mar. 20, 2009 from http://people.csa.iisc.emet.in/parag/Projects_files/Report.pdf pp. 1-5.

Moritz, Csaba Andras, "An Introduction to Prefetching." Nov. 2007, C.A. Moritz, Guo Yao and SSA Group. Software System & Architecture Lab, Electrical & Computer Engineering. pp. 1-84.

Dreslinski, Ronald G. et al. "Analysis of Hardware Prefetching Across Virtual Page Boundaries." Jul. 2007, CF '07, ACM 978-1-59593-683. pp. 13-21.

\* cited by examiner

SELECTIVE PREFETCHING OF PHYSICALLY SEQUENTIAL CACHE LINE TO CACHE LINE THAT INCLUDES LOADED PAGE TABLE ENTRY

CROSS REFERENCE TO RELATED APPLICATIONS

This application is a continuation-in-part (CIP) of co-pending U.S. patent application Ser. No. 13/872,527, filed Apr. 29, 2013, which is a continuation of U.S. patent application Ser. No. 13/412,934, filed Mar. 6, 2012, which is hereby incorporated by reference in its entirety, and which has issued as U.S. Pat. No. 8,433,853. U.S. patent application Ser. No. 13/412,934 is a continuation of U.S. patent application Ser. No. 12/604,998, filed Oct. 23, 2009, which is hereby incorporated by reference in its entirety, which has issued as U.S. Pat. No. 8,161,246, and which claims priority based on U.S. Provisional Application Ser. No. 61/164,588, filed Mar. 30, 2009, which is hereby incorporated by reference in its entirety.

FIELD OF THE INVENTION

The present invention relates in general to microprocessors, and more particularly to the prefetching of data thereby.

BACKGROUND OF THE INVENTION

Many modern microprocessors include virtual memory capability, and in particular, a memory paging mechanism. As is well known in the art, the operating system creates page tables that it stores in system memory that are used to translate virtual addresses into physical addresses. The page tables may be arranged in a hierarchical fashion, such as according to the well-known scheme employed by x86 architecture processors as described in Chapter 3 of the IA-32 Intel Architecture Software Developer's Manual, Volume 3A: System Programming Guide, Part 1, June 2006, which is hereby incorporated by reference in its entirety for all purposes. In particular, page tables include page table entries (PTE), each of which stores a physical page address of a physical memory page and attributes of the physical memory page. The process of taking a virtual memory page address and using it to traverse the page table hierarchy to finally obtain the PTE associated with the virtual address in order to translate the virtual address to a physical address is commonly referred to as a tablewalk.

Because the latency of a physical memory access is relatively slow, the tablewalk is a relatively costly operation since it involves potentially multiple accesses to physical memory. To avoid incurring the time associated with a tablewalk, processors commonly include a translation lookaside buffer (TLB) that caches the virtual to physical address translations. However, the size of the TLB is finite, and when a TLB miss occurs, the tablewalk must be incurred. Therefore, what is needed is a way to reduce the time required to perform a page table walk.

BRIEF SUMMARY OF INVENTION

In one aspect, the present invention provides a microprocessor. The microprocessor includes a translation lookaside buffer and a first request to load into the microprocessor a page table entry in response to a miss of a virtual address in the translation lookaside buffer. The requested page table entry is included in a page table. The page table encompasses a plurality of cache lines including a first cache line that includes the requested page table entry. The microprocessor also includes hardware logic that makes a determination whether a second cache line physically sequential to the first cache line is outside the page table, and a second request to prefetch the second cache line into the microprocessor. The second request is selectively generated based at least on the determination made by the hardware logic.

In another aspect, the present invention provides a method that includes generating a first request to load into a microprocessor a page table entry in response to a miss of a virtual address in a translation lookaside buffer of the microprocessor. The requested page table entry is included in a page table. The page table encompasses a plurality of cache lines including a first cache line that includes the requested page table entry. The method also includes making a determination of whether a second cache line physically sequential to the first cache line is outside the page table. The method also includes selectively generating a second request to prefetch the second cache line into the microprocessor based at least on the determination.

In yet another aspect, the present invention provides a computer program product encoded in at least one non-transitory computer usable medium for use with a computing device, the computer program product comprising computer usable program code embodied in said medium for specifying a microprocessor. The computer usable program code includes first program code for specifying a translation lookaside buffer and second program code for specifying a first request to load into the microprocessor a page table entry in response to a miss of a virtual address in the translation lookaside buffer. The requested page table entry is included in a page table. The page table encompasses a plurality of cache lines including a first cache line that includes the requested page table entry. The computer usable program code also includes third program code for specifying hardware logic that makes a determination whether a second cache line physically sequential to the first cache line is outside the page table. The computer usable program code also includes fourth program code for specifying a second request to prefetch the second cache line into the microprocessor. The second request is selectively generated based at least on the determination made by the hardware logic.

DETAILED DESCRIPTION OF THE INVENTION

Figure 1:
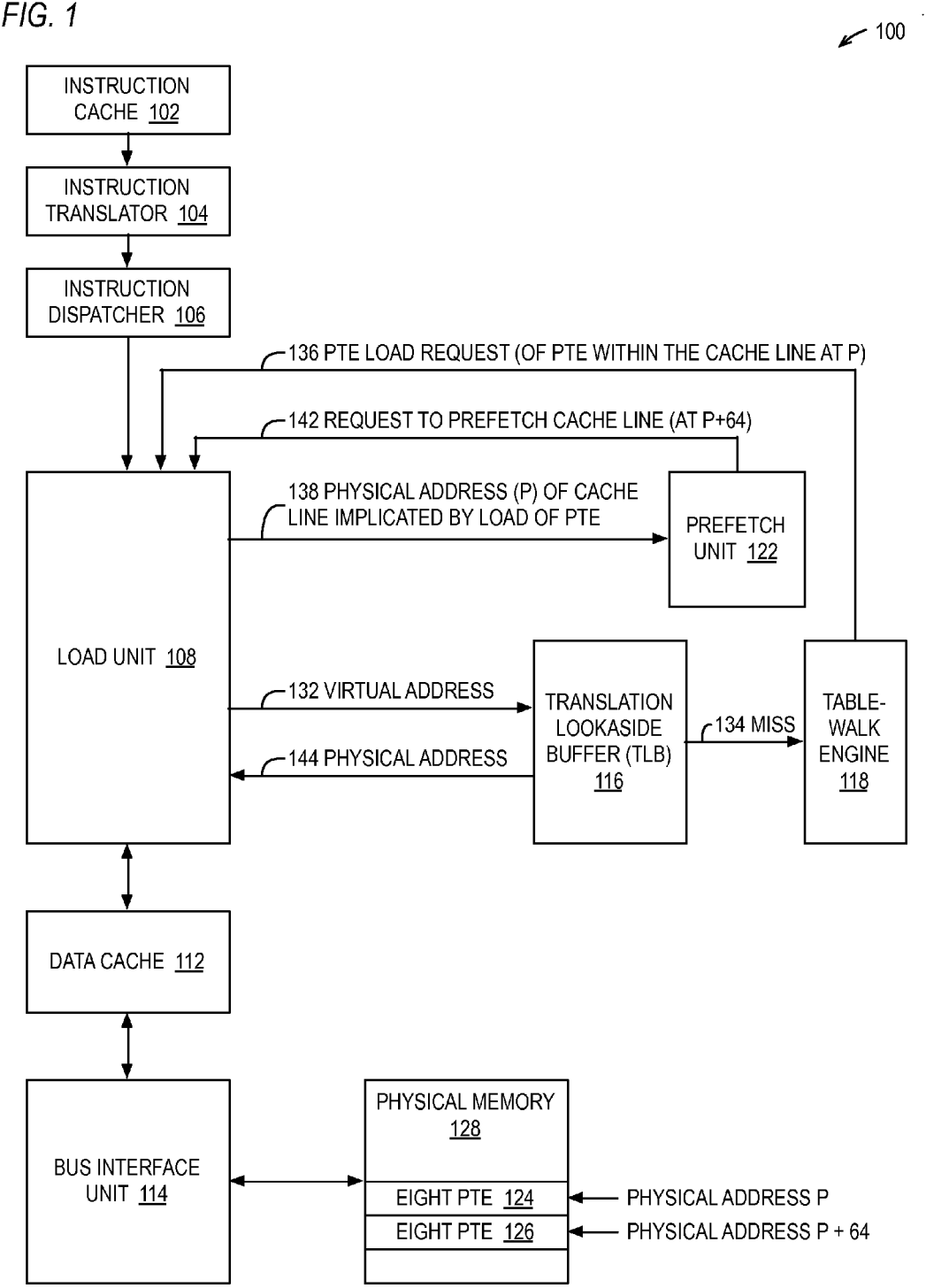
FIG. 1 is a block diagram illustrating a microprocessor.

Referring now to FIG. 1, a block diagram illustrating a microprocessor 100 according to the present invention is shown. The microprocessor 100 includes The microprocessor 100 is a pipelined microprocessor that includes an instruction cache 102 that provides instructions to an instruction translator 104, which translates instructions and provides them to an instruction dispatcher 106. The instructions may include memory access instructions (such as load or store instructions) that are provided to a load unit 108. The load unit 108 provides the virtual address 132 specified by a memory access instruction to a translation lookaside buffer (TLB) 116 that does a lookup of the virtual address 132 and provides the translated physical address 144, if present, back to the load unit 108. If the virtual address 132 is not present, the TLB 116 generates a miss signal 134 to a tablewalk engine 118, which is coupled to the load unit 108 and to the TLB 116.

A prefetch unit 122 and data cache 112 are also coupled to the load unit 108. Finally, a bus interface unit 114 is coupled to the data cache 112. The bus interface unit 114 interfaces the microprocessor 100 to a processor bus that is coupled to physical memory 128 of the computer system in which the microprocessor 100 resides. The physical memory 128, among other things, stores page tables, one of which includes a first cache line of eight PTE 124 at physical address P and a second cache line of eight PTE 126 at physical address P+64 (the size of a cache line being 64 bytes in the embodiment of FIG. 1). In the embodiments described, it is assumed that the size of a PTE is eight bytes; thus, each cache line may hold eight PTE.

Figure 2:
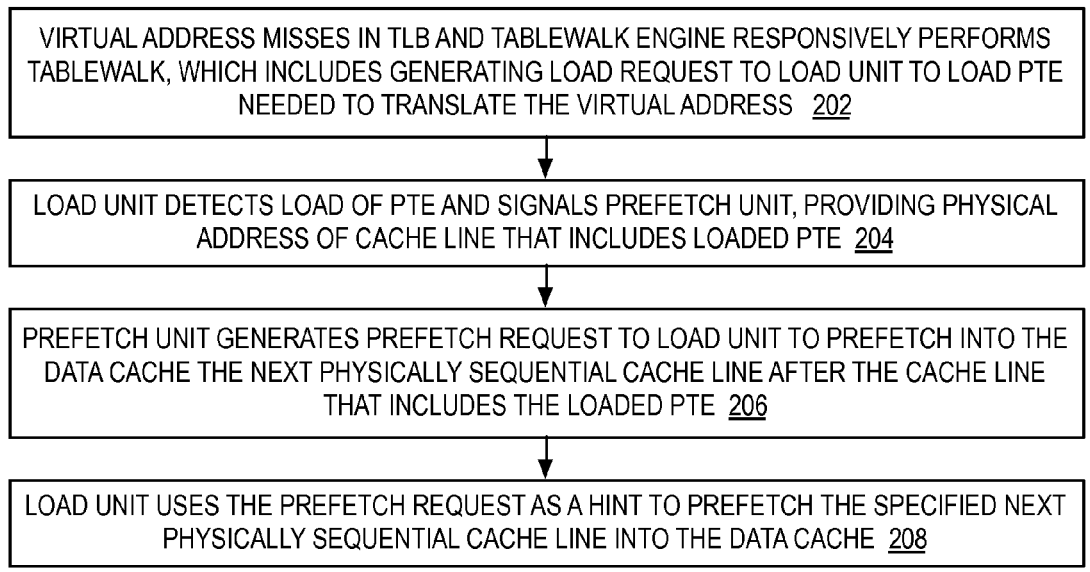
FIG. 2 is a flowchart illustrating steps performed by the microprocessor of FIG. 1.

Referring now to FIG. 2, a flowchart illustrating operation of the microprocessor 100 of FIG. 1 to prefetch a next sequential cache line to a cache line implicated by a PTE load according to the present invention is shown. Flow begins at block 202.

At block 202, when the virtual address 132 misses in the TLB 116, the TLB 116 generates a miss signal 134 to a tablewalk engine 118. The tablewalk engine 118 responsively performs a tablewalk in order to obtain the physical address translation of the virtual address 132 missing in the TLB 116. The tablewalk includes the tablewalk engine 118 generating a PTE load request 136 to the load unit 108 to load a PTE needed to perform the address translation. Flow proceeds to block 204.

At block 204, the load unit 108 responsively detects the PTE load request 136 and loads the PTE from its location in the physical memory 128. Additionally, the load unit 108 signals the prefetch unit 122 via signal 138 that it has seen a PTE load request and provides to the prefetch unit 122 the physical address 138 of the cache line 124 that includes the loaded PTE, which is at physical address P in the example of FIG. 1. Flow proceeds to block 206.

At block 206, the prefetch unit 122 responsively generates to the load unit 108 a prefetch request 142. The prefetch request 142 requests the load unit 108 to prefetch into the data cache 112 the cache line 126 at physical address P+64, i.e., the next physically sequential cache line 126 after the cache line that includes the PTE loaded at block 204. Flow proceeds to block 208.

At block 208, the load unit 108 uses the prefetch request 142 as a hint to prefetch into the data cache 112 the next physically sequential cache line 126. In particular, the load unit 108 attempts to load the cache line 126 into the data cache 112. However, under some circumstances present within the microprocessor 100, the load unit 108 may decide to forego the loading of the cache line 126. One circumstance may be a functional requirement, such as that the cache line falls in an architecturally non-cacheable memory region. Another circumstance may be a heuristic decision, such as the utilization of resources for performing cache line allocations has risen above some watermark suggesting that the microprocessor 100 should minimize speculative allocations in favor of pursuing non-speculative allocations. If the load unit 108 decides to load the next sequential cache line 126 from physical memory 128, the load unit 108 commands the bus interface unit 114 to do so. Flow ends at block 208.

Although the embodiments described have prefetched the next sequential physical cache line, in alternate embodiments, the prefetch unit generates a request to prefetch the previous sequential physical cache line, either instead of or in addition to the next sequential physical cache line. These embodiments are advantageous if the program is proceeding through memory pages in the other direction.

Additionally, although the embodiments described have prefetched the next sequential physical cache line of PTE, embodiments are contemplated in which the prefetch unit generates a request to prefetch the next sequential physical cache line of other levels of a paging information hierarchy, such as a cache line of page descriptor entries (PDE), although one would expect a smaller benefit. The sheer volume of the physical memory underlying a single PDE suggests that the reward would be low due to infrequency and the risk would be high due to the relatively lethargic rate at which a program tends to traverse memory, although the access patterns of some programs might see a benefit. Still further, embodiments are contemplated in which the prefetch unit generates a request to prefetch the next sequential physical cache line of information within a different page table hierarchy structure than the well-known PDE/PTE hierarchy discussed herein.

As described above, the prefetch unit generates a request to prefetch the next physically sequential cache line to the cache line just read that includes the PTE needed to complete the tablewalk. Assuming each page table is 4 KB, each PTE is eight bytes, and each cache line is 64 bytes, then there are 64 cache lines each having eight PTE in a page table; thus, it is highly probable that the next physically sequential cache line prefetched at block 208 contains the next eight PTE in the page table. The probability is particularly high if the operating system lays out the page tables physically sequential to one another.

This is advantageous because there is a relatively high probability, particularly with small pages (typically 4 KB), that the program will eventually access at least some of the next eight pages of memory beyond the current page that was virtually accessed to cause the TLB miss at block 202. For a relatively modest amount of additional logic added to the prefetch unit and load unit, in one embodiment the prefetch unit generates a request to prefetch eight PTE, which may potentially greatly reduce the number of clock cycles required to perform a page table walk to populate the TLB for the eight memory pages whose physical address is stored in the eight PTE. Specifically, when the tablewalk engine 118 has to do a tablewalk that involves a load of any of the eight PTE in the next physically sequential cache line 126, they will be present in the data cache 112 (unless they are subsequently evicted from the data cache 112), which will eliminate the need for the long latency read of physical memory 128 to get the PTE.

Prefetch schemes exist which attempt to detect memory access patterns of program memory accesses, i.e., program instruction loads and stores. If the prefetcher detects the program accessing memory in a pattern, the prefetcher will attempt to anticipate the addresses of future program loads/stores and prefetch from them. If the program is accessing memory sequentially, the prefetcher may prefetch the next sequential cache line, typically based on the virtual address of the load/store. In a processor architecture for which the operating system performs tablewalks, the program load/store-based prefetcher may prefetch the next sequential cache line after a PTE load. However, in processors that perform the tablewalks in hardware, rather than using program load/stores, the program load/store-based prefetcher will not trigger off a PTE load, since it is not a program load, and will therefore not prefetch the next sequential cache line after a PTE load. Advantageously, in our hardware-based tablewalk microprocessor, our prefetch unit triggers off of a non-program PTE load, which is a physical memory access generated by our tablewalk engine. Thus, unlike the program load/store-based schemes, the prefetch unit generates requests to advantageously prefetch the next physically sequential cache line, which likely contains the next few PTE in the page table.

Selective Prefetching

The PTE prefetching mechanism described with respect to FIGS. 1 and 2 may be advantageous for reducing tablewalk time. As described above, it is highly probable that the next physically sequential cache line prefetched contains the next several PTE in the page table. The probability is particularly high if the operating system lays out the page tables physically sequential to one another, which may be advantageous because there is a relatively high probability that the program will eventually access at least some of the next several pages of memory beyond the current page that was virtually accessed to cause the TLB miss. However, if the operating system does not lay out the page tables physically sequential to one another, or at least not some of them, then prefetching the next sequential cache line may result in evicting a cache line from the cache memory hierarchy that would have been more useful than the prefetched cache line. Embodiments are described below that address this and potentially improve cache efficiency.

GLOSSARY

A page table entry (PTE) stores a physical page address of a physical memory page and attributes of the physical memory page. The PTEs are included in page tables of the memory paging mechanism of the microprocessor. The physical memory address of a PTE is naturally aligned to the size of a PTE. In some embodiments, PTEs are 4 bytes; in other embodiments PTEs are 8 bytes; although other embodiments are contemplated.

A page table is a set of physically contiguous PTEs. The physical memory address of a page table is naturally aligned on an address boundary that is the size of the page table. In one embodiment, a page table is 4 Kbytes, in which case the page table includes 1024 4-byte PTEs, or 512 8-byte PTEs, for example. However, other embodiments with different size page tables are contemplated. Each PTE in the page table has an index that is determined from a portion of the bits of the virtual address being translated. For example, in the case of a 4 Kbyte page table and 4 byte PTEs, bits 21:12 of the virtual address specify the index of the PTE into the page table. For another example, in the case of a 4 Kbyte page table and 8 byte PTEs, bits 20:12 of the virtual address specify the index of the PTE into the page table.

A page table encompasses multiple cache lines whose physical addresses are naturally aligned to the size of a cache line. In one embodiment, the size of a cache line is 64 bytes, although other embodiments are contemplated. Because a cache line is larger than a PTE, each cache line includes multiple PTEs. Each cache line encompassed by the page table has an index that is determined from a portion of the bits of the virtual address being translated. For example, in the case of a 4 Kbyte page table and 64 byte cache lines, bits 21:16 of the virtual address specify the index of the cache line within the page table.

The last cache line of a page table is the cache line with the largest index of the cache lines encompassed by the page table. For example, in the case of a 4 Kbyte page table and 64 byte cache lines and 4-byte PTEs, the index of the last cache line of the page table (bits 21:16 of the virtual address) is 0x3F (or binary 111111). For another example, in the case of a 4 Kbyte page table and 64 byte cache lines and 8-byte PTEs, the index of the last cache line of the page table (bits 20:15 of the virtual address) is 0x3F (or binary 111111).

Figure 3:
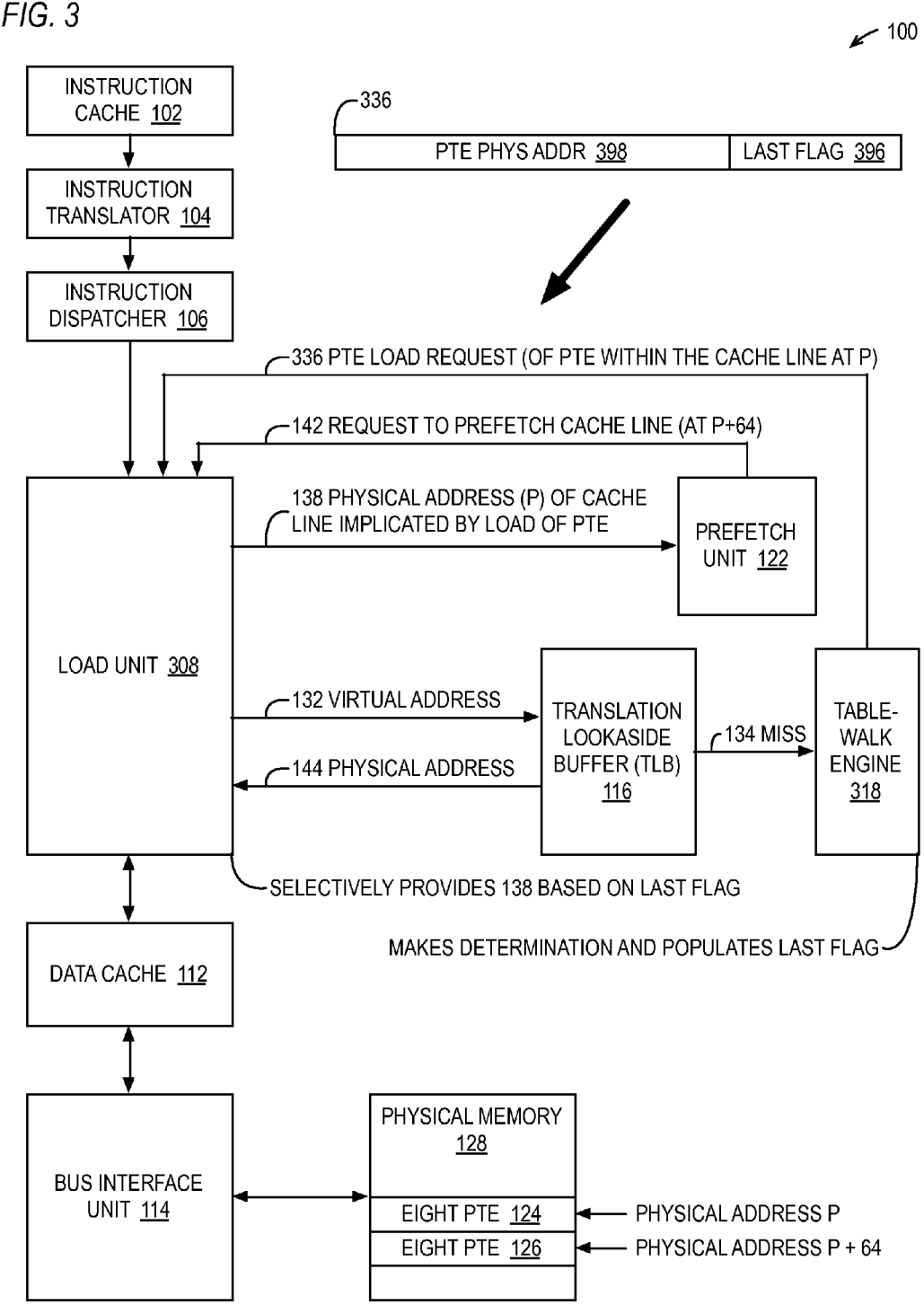
FIG. 3 is a block diagram illustrating a microprocessor.

Referring now to FIG. 3, a block diagram illustrating a microprocessor 100 is shown. The microprocessor 100 of FIG. 3 is similar in many respects to the microprocessor 100 of FIG. 1, and like-numbered elements are similar, unless otherwise noted. Differences in FIG. 3 from FIG. 1 are modifications to the load unit 308, tablewalk engine 318 and PTE load request 336 (hence, these corresponding elements to FIG. 1 have a different reference number). More specifically, the PTE load request 336 includes a last flag 396 in addition to the physical address 398 of the PTE being requested (which is within the cache line at physical address P); additionally, the tablewalk engine 318 makes a determination of whether the cache line that includes the PTE is the last cache line of the page table that includes the PTE and populates the last flag 396 accordingly; finally, the load unit 308 examines the last flag 396 to decide whether to provide the physical address 138 of the cache line to the prefetch unit 122, as described in more detail with respect to FIGS. 4 through 8.

Figure 4:
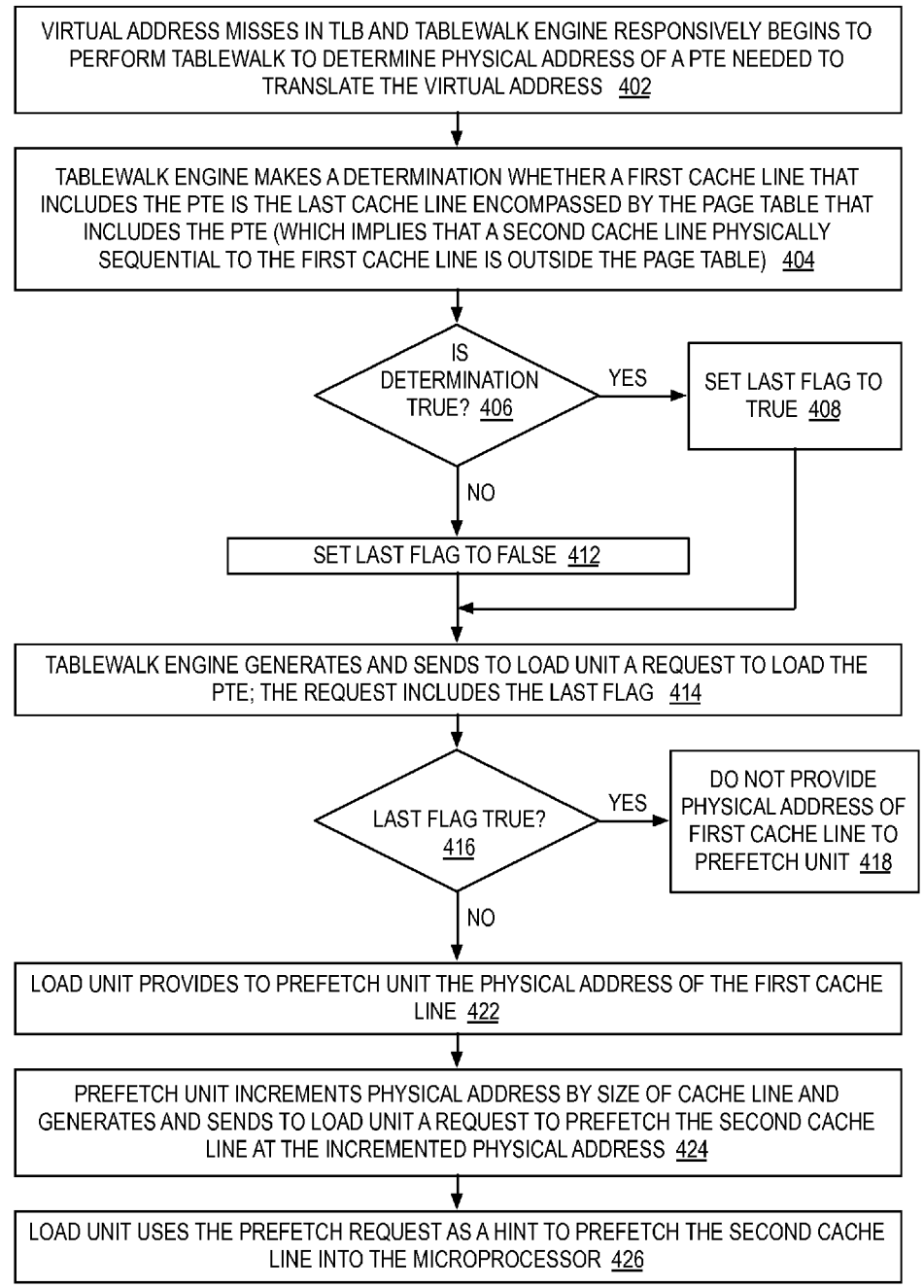
FIG. 4 is a flowchart illustrating operation of the microprocessor of FIG. 3.

Referring now to FIG. 4, a flowchart illustrating operation of the microprocessor 100 of FIG. 3 is shown. Flow begins at block 402.

At block 402, when the virtual address 132 misses in the TLB 116, the TLB 116 generates a miss signal 134 to a tablewalk engine 318. The tablewalk engine 318 responsively performs a tablewalk in order to obtain the physical address translation of the virtual address 132 missing in the TLB 116. The tablewalk includes the tablewalk engine 318 determining the physical address of a PTE that is needed to perform the address translation. The tablewalk may include accessing other structures of the paging mechanism of the microprocessor 100 to determine the physical address of the PTE. For example, in an x86 architecture embodiment, the tablewalk may involve access to a PML4 entry (PML4E), a PDPT entry (PDPTE), and/or a page directory entry (PDE), depending upon whether the microprocessor 100 is in 32-bit, PAE or IA-32e paging mode. Some or all of these structures may be cached within caching structures of the microprocessor 100 associated with the paging mechanism, such a PML4 cache, PDPTE cache or PDE cache, or within the various levels of cache memory of the microprocessor 100, including the data cache 112. Other embodiments are contemplated that encompass other processor architectures that include virtual memory capability and that employ page tables and other paging structures in their memory paging mechanisms, such as the SPARC Architecture, the ARM Architecture, the PowerPC Architecture, and other well-known processor architectures. Flow proceeds to block 404.

At block 404, the tablewalk engine 318 makes a determination whether the cache line (first cache line) that includes the PTE of block 402 is the last cache line in the page table that includes the PTE. This implies that a second cache line that is physically sequential to the first cache line (i.e., the second cache lines has a physical address that equals the physical address of the first cache line incremented by the size of a cache line). Preferably, the tablewalk engine 318 examines predetermined bits of the virtual address 132 that missed in the TLB 116 at block 402 to make the determination. The operation at block 404 is described in more detail with respect to FIGS. 5 and 6. Flow proceeds to decision block 406.

At decision block 406, if the determination made at block 404 is true, flow proceeds to block 408; otherwise, flow proceeds to block 412.

At block 408, the tablewalk engine 318 sets the last flag 396 to true of the request 336 to be generated at block 414. Flow proceeds to block 414.

At block 412, the tablewalk engine 318 sets the last flag 396 to false of the request 336 to be generated at block 414. Flow proceeds to block 414.

At block 414, the tablewalk engine 318 generates a request 336 to load the PTE whose physical address was determined at block 402 and sends the request 336 to the load unit 308. The request 336 includes the last flag 396 value generated at either block 408 or block 412. When the PTE is subsequently obtained, the tablewalk engine 318 uses the PTE to translate the virtual address 132 and then completes the tablewalk by updating the TLB 116 with the physical address that is the translation of the virtual address 132. Flow proceeds to decision block 416.

At decision block 416, the load unit 308 determines whether the last flag 396 is true. If so, flow proceeds to block 418; otherwise, flow proceeds to block 422.

At block 418, the load unit 308 does not provide the physical address 138 of the first cache line to the prefetch unit 122 and flow ends.

At block 422, the load unit 308 provides the physical address 138 of the first cache line to the prefetch unit 122. Flow proceeds to block 424.

At block 424, the prefetch unit 122 increments the physical address of the first cache line 138 by the size of a cache line (e.g., 64 bytes) and sends to the load unit 308 a request 142 to prefetch the second cache line at the incremented address. Flow proceeds to block 426.

At block 426, the load unit 308 uses the prefetch request 142 as a hint to prefetch the second cache line into the microprocessor 100. Flow ends at block 426.

Figure 5:
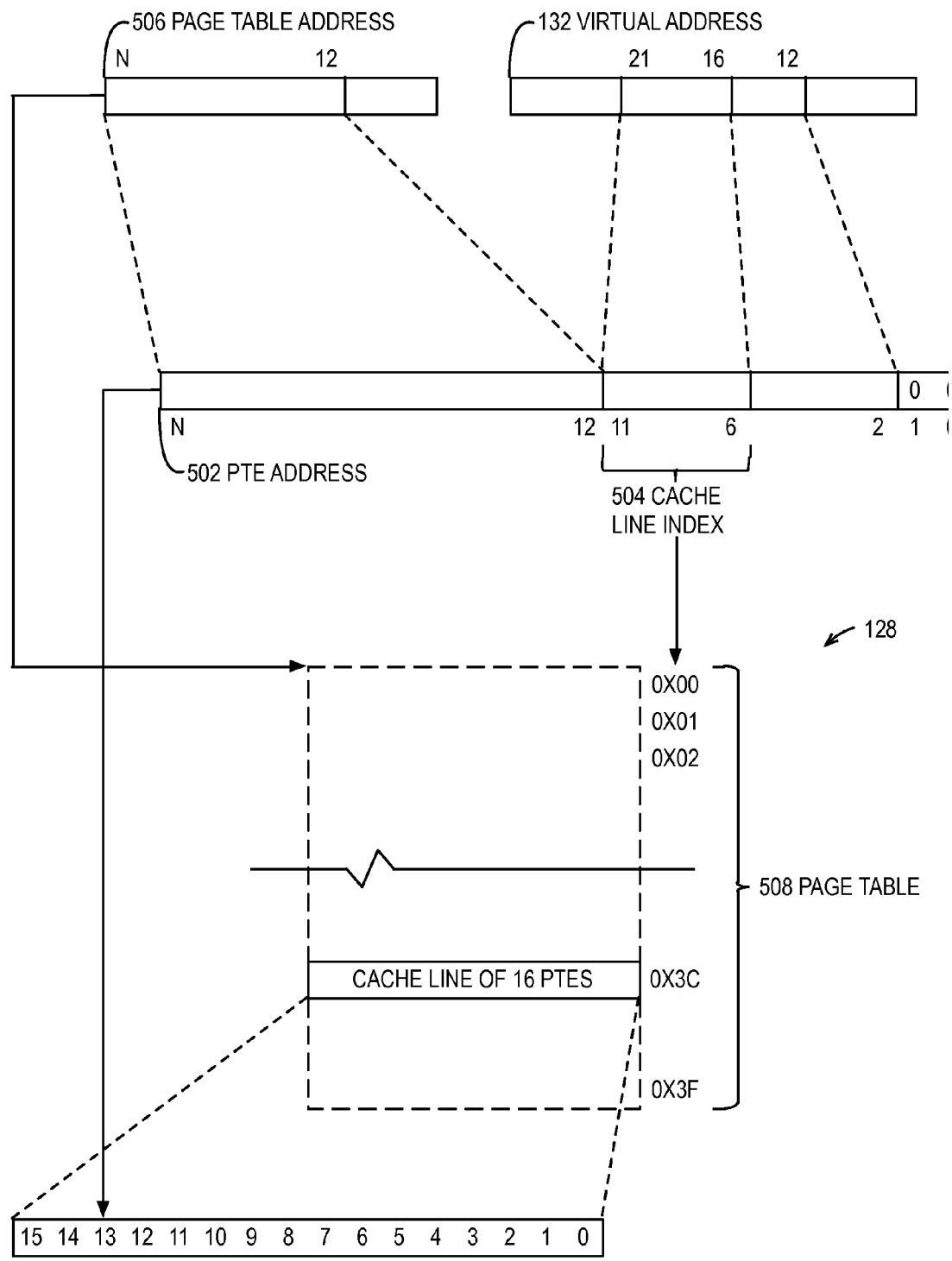
FIG. 5 is a block diagram illustrating the formation of a PTE physical address by the tablewalk engine.

Referring now to FIG. 5, a block diagram illustrating the formation of a PTE address 502 by the tablewalk engine 318 is shown. The PTE address 502 is a physical address. The example of FIG. 5 describes the creation of a PTE address 502 in an embodiment in which a PTE is 4 bytes in size and a page table is 4 Kbytes. FIG. 5 also illustrates the bits of the PTE address 502 that make up the index 504 of the cache lines encompassed by a page table 508 of PTEs that includes the PTE. The formation of the PTE address 502 is specified by the microprocessor 100 architecture.

The tablewalk engine 318 forms the PTE address 502 from the virtual address 132 and a page table address 506. That is, the PDE includes a pointer to the page table 508, which is the physical memory address of the base of the page table 508, as shown. Typically, the page table address 506 is obtained from a page directory entry (PDE), although in some paging modes (e.g., having only one level of paging structure) the PTE address 502 may be obtained directly from a register of the microprocessor 100 (e.g., the CR3 register in the x86 architecture).

In the example of FIG. 5, the lower two bits are populated with zero values, since in the example a PTE is 4 bytes and is 4-byte aligned. Bits [21:12] of the virtual address 132 become bits [11:2] of the PTE address 502, and bits [N:12] of the page table address 506, where N is the most significant bit of the page table address 506 and PTE address 502 (e.g., bit 31 in a 32-bit physical address, bit 35 in a 36-bit physical address, bit 39 in a 40-bit physical address). The PTE address 502 points to a PTE within the page table 508, which is the physical memory address of the PTE, as shown. In the example of FIG. 5, the PTE address 502 points to PTE 13 within a cache line of 16 PTEs.

As shown, the cache line index 504 is bits [11:6] of the PTE address 502, which correspond to bits [21:16] of the virtual address 132. Thus, the cache line index 504 may be determined from either the virtual address 132 or the formed PTE address 502 (e.g., as by the load unit 1108 of the embodiment of FIG. 11). In the example of FIG. 5, the cache line index 504 of the cache line containing the PTE pointed to by the PTE address 502 has a value of 0x3C. As shown, the largest cache line index 504 is 0x3F since there are 64 cache lines encompassed by the page table 508 (e.g., in an embodiment in which cache lines are 64 bytes and page tables are 4 Kbytes).

Figure 6:
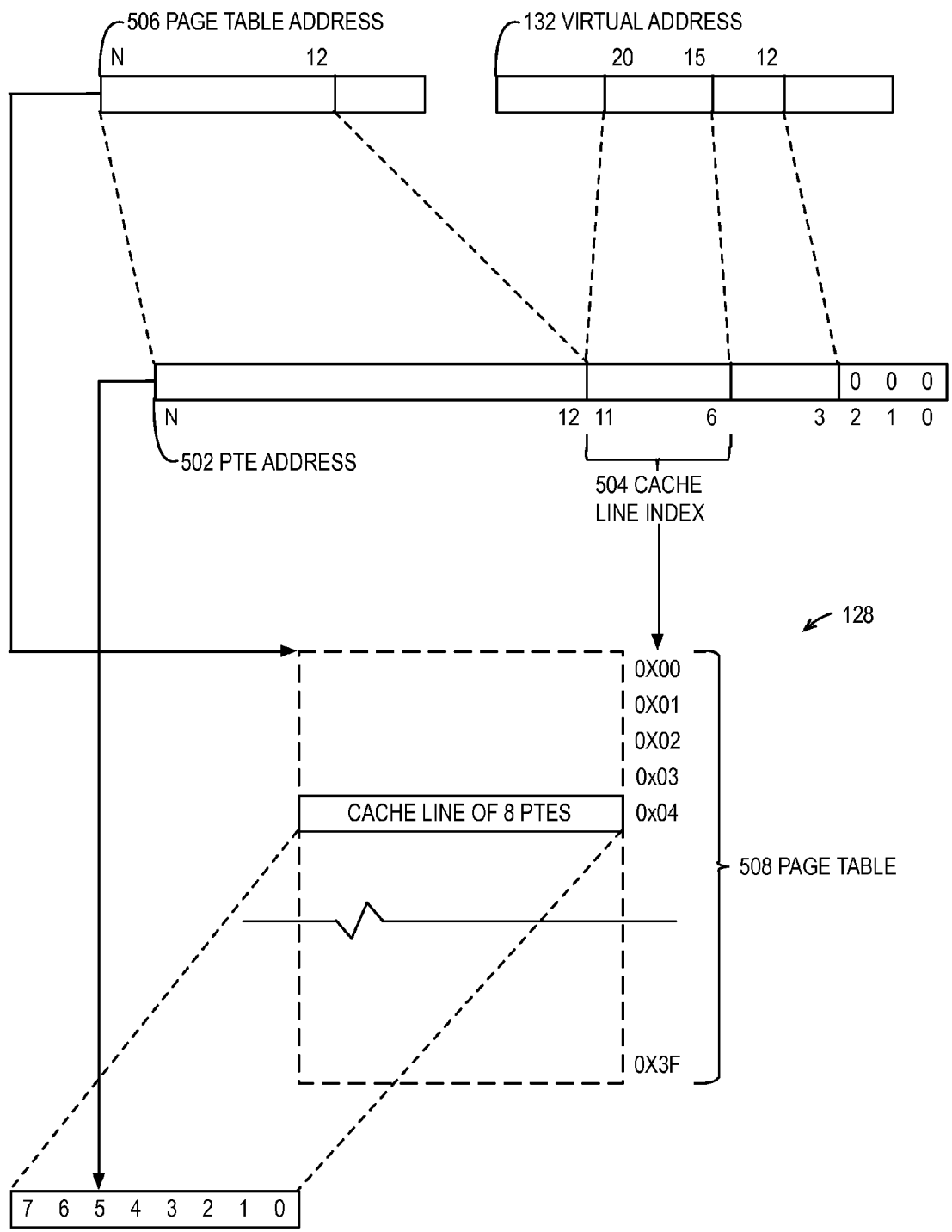
FIG. 6 is a block diagram illustrating the formation of a PTE physical address by the tablewalk engine.

Referring now to FIG. 6, a block diagram illustrating the formation of a PTE address 502 by the tablewalk engine 318 in an embodiment in which a PTE is 8 bytes (rather than 4 bytes as in FIG. 5) is shown. FIG. 6 is similar to FIG. 5 except for the following. First, the lower three bits (rather than the lower two bits as in FIG. 5) are populated with zero values, since in the example a PTE is 8 bytes and is 8-byte aligned. Furthermore, bits [20:12] of the virtual address 132 become bits [11:3] of the PTE address 502 (rather than bits [21:12] of the virtual address 132 becoming bits [11:2] of the PTE address 502 as in FIG. 5). In the example of FIG. 6, the PTE address 502 points to PTE 5 within a cache line of 8 PTEs (rather than to a cache line of 16 PTEs of FIG. 5). As shown, the cache line index 504 is bits [11:6] of the PTE address 502, which correspond to bits [20:15] of the virtual address 132 in the embodiment of FIG. 6 (rather than to bits [21:16] of FIG. 5). In the example of FIG. 5, the cache line index 504 of the cache line containing the PTE pointed to by the PTE address 502 has a value of 0x04.

Figure 7:
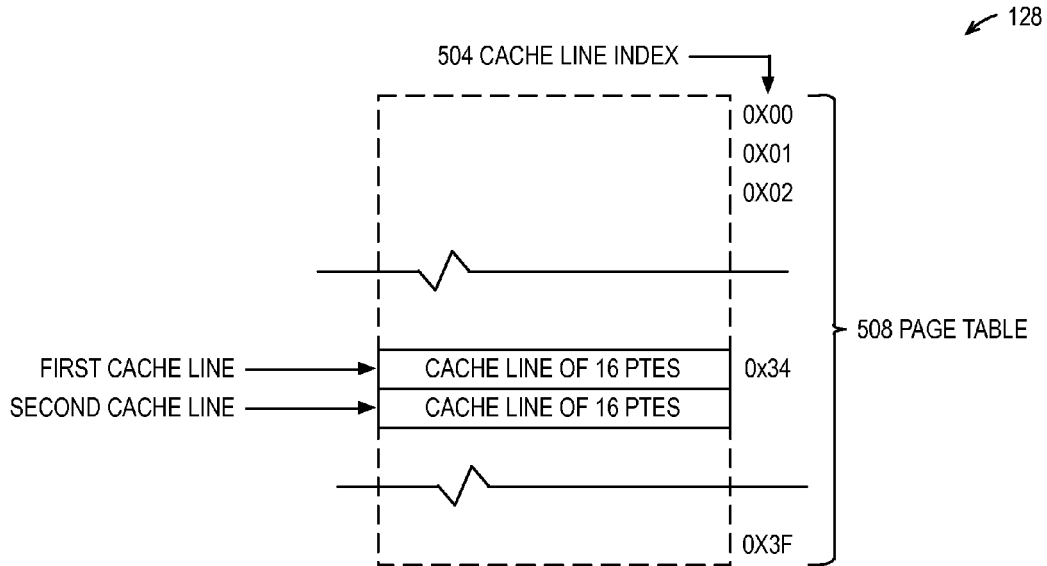
FIGS. 7 through 10 are block diagrams illustrating examples of the making of the determination of whether the second cache line is outside the page table.

Referring now to FIG. 7, a block diagram illustrating a first example of the making of the determination of whether the second cache line (i.e., the physically sequential cache line to the cache line (first cache line) that contains the PTE being requested in response to the TLB miss) is outside the page table 508, such as by the tablewalk engine 318 at block 404 of FIG. 4, is shown. The determination is made by examining the cache line index 504 of the first cache line and comparing its equality with the largest cache line index 504 value (e.g., 0x3F), i.e., the cache line index 504 of the last cache line encompassed by the page table 508. More specifically, if the first cache line is the last cache line encompassed by the page table 508 (i.e., at the end of the page table 508), then the physically sequential cache line (the second cache line) is outside the page table 508. The determination is true, i.e., the second cache line is outside the page table 508, if the cache line index 504 of the first cache line equals the largest cache line index value; otherwise, the determination is false.

In the example of FIG. 7, the virtual address 132 has a value of 0x12345678. Consequently, 0x34 is the value of bits [21:16] of the virtual address 132, which is bits [11:6] of the PTE address 502, which is the first cache line index 504. Therefore, since the first cache line index 504 value of 0x34 is less than the highest cache line index 504 of 0x3F, the determination is false and the last flag 396 is set to a false value, as shown. As shown, the second cache line is encompassed by the page table 508 rather than being outside the page table 508.

Figure 8:
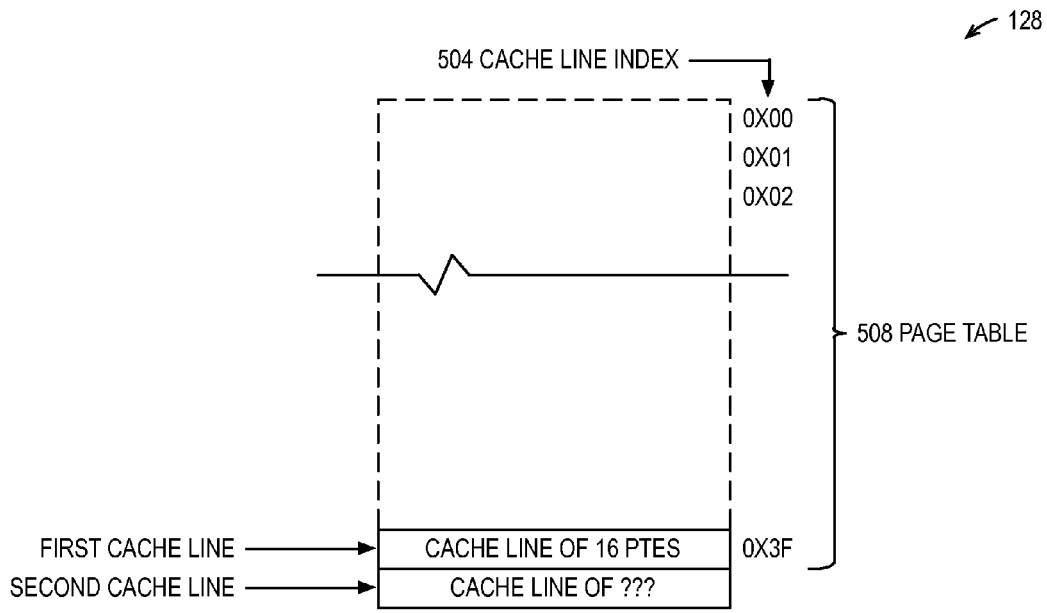

Referring now to FIG. 8, a block diagram illustrating a second example of the making of the determination of whether the second cache line is outside the page table 508 is shown. FIG. 8 is similar to FIG. 7, except the value of the virtual address 132 is different. In the example of FIG. 8, the virtual address 132 has a value of 0x123F5678. Consequently, 0x3F is the value of bits [21:16] of the virtual address 132, which is bits [11:6] of the PTE address 502, which is the first cache line index 504. Therefore, since the first cache line index 504 value of 0x3F is equal to the highest cache line index 504 of 0x3F, the determination is true and the last flag 396 is set to a true value, as shown. As shown, the second cache line is outside the page table 508 rather than being encompassed by the page table 508. Consequently, the second cache line may or may not be a cache line that includes PTEs, and even if it does, it may not include the PTEs of a page table that is the next page table pointed to by the next PDE in the paging structures. Thus, the embodiments described herein selectively prefetch the second cache line, which may potentially advantageously reduce pollution of the cache hierarchy of the microprocessor 100, as described above.

Figure 9:
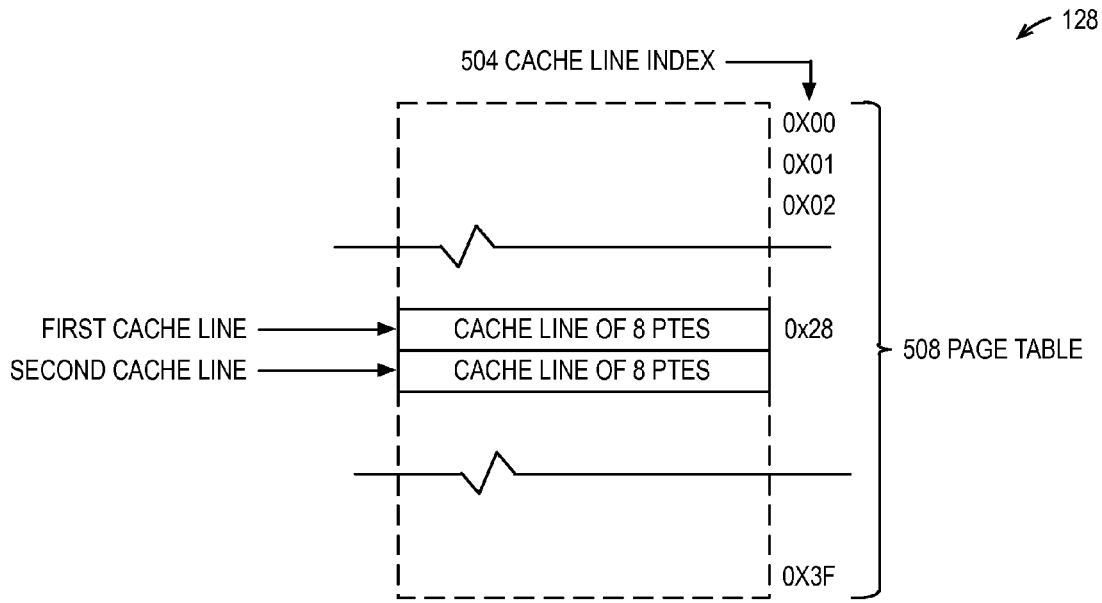

Referring now to FIG. 9, a block diagram illustrating a third example of the making of the determination is shown. FIG. 9 is similar to FIG. 7, except that in the embodiment of FIG. 9, 8-byte PTEs are employed; hence, each cache line includes only 8 PTEs. As in FIG. 7, the determination is made by examining the cache line index 504 of the first cache line and comparing its equality with the largest cache line index 504 value (e.g., 0x3F), i.e., the cache line index 504 of the last cache line encompassed by the page table 508. However, in FIG. 9, bits [20:15] of the virtual address 132 (rather than bits [21:16] of the virtual address 132, as in FIG. 7), which in both cases are bits [11:6] of the PTE address 502, are examined to make the determination.

In the example of FIG. 9, the virtual address 132 has a value of 0x12345678. Consequently, 0x28 is the value of bits [20:15] of the virtual address 132, which is bits [11:6] of the PTE address 502, which is the first cache line index 504. Therefore, since the first cache line index 504 value of 0x28 is less than the highest cache line index 504 of 0x3F, the determination is false and the last flag 396 is set to a false value, as shown. As shown, the second cache line is encompassed by the page table 508 rather than being outside the page table 508.

Figure 10:
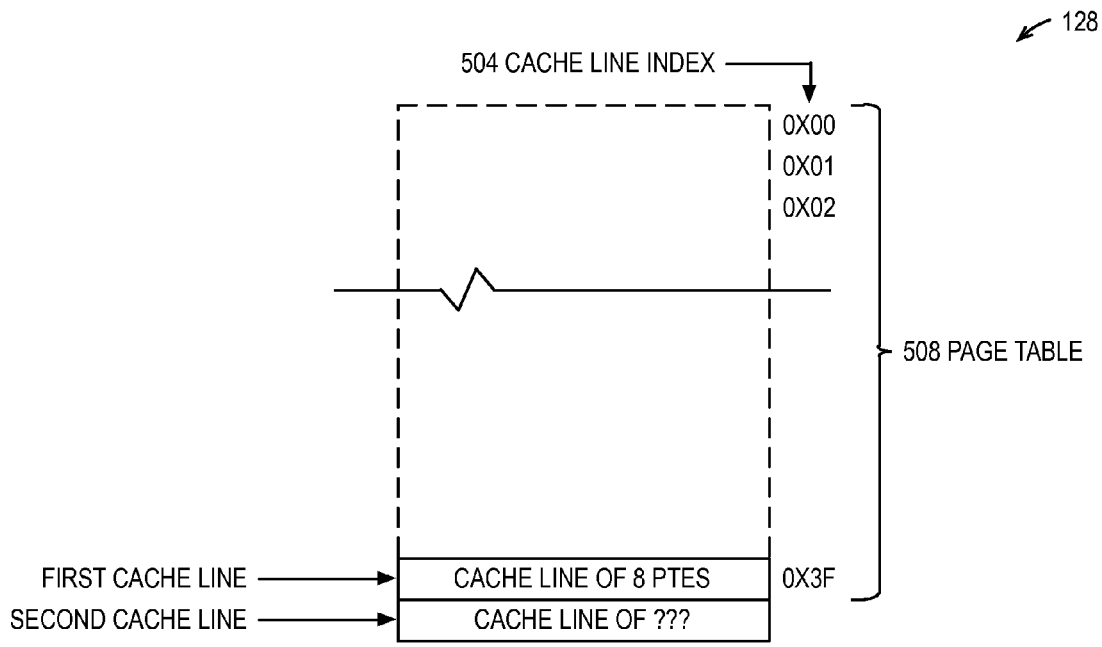

Referring now to FIG. 10, a block diagram illustrating a fourth example of the making of the determination of whether the second cache line is outside the page table 508 is shown. FIG. 10 is similar to FIG. 9, except the value of the virtual address 132 is different. In the example of FIG. 10, the virtual address 132 has a value of 0x123FD678. Consequently, 0x3F is the value of bits [20:15] of the virtual address 132, which is bits [11:6] of the PTE address 502, which is the first cache line index 504. Therefore, since the first cache line index 504 value of 0x3F is equal to the highest cache line index 504 of 0x3F, the determination is true and the last flag 396 is set to a true value, as shown. As shown, the second cache line is outside the page table 508 rather than being encompassed by the page table 508. Thus, the embodiments described herein selectively prefetch the second cache line, which may potentially advantageously reduce pollution of the cache hierarchy of the microprocessor 100, as described above.

Figure 11:
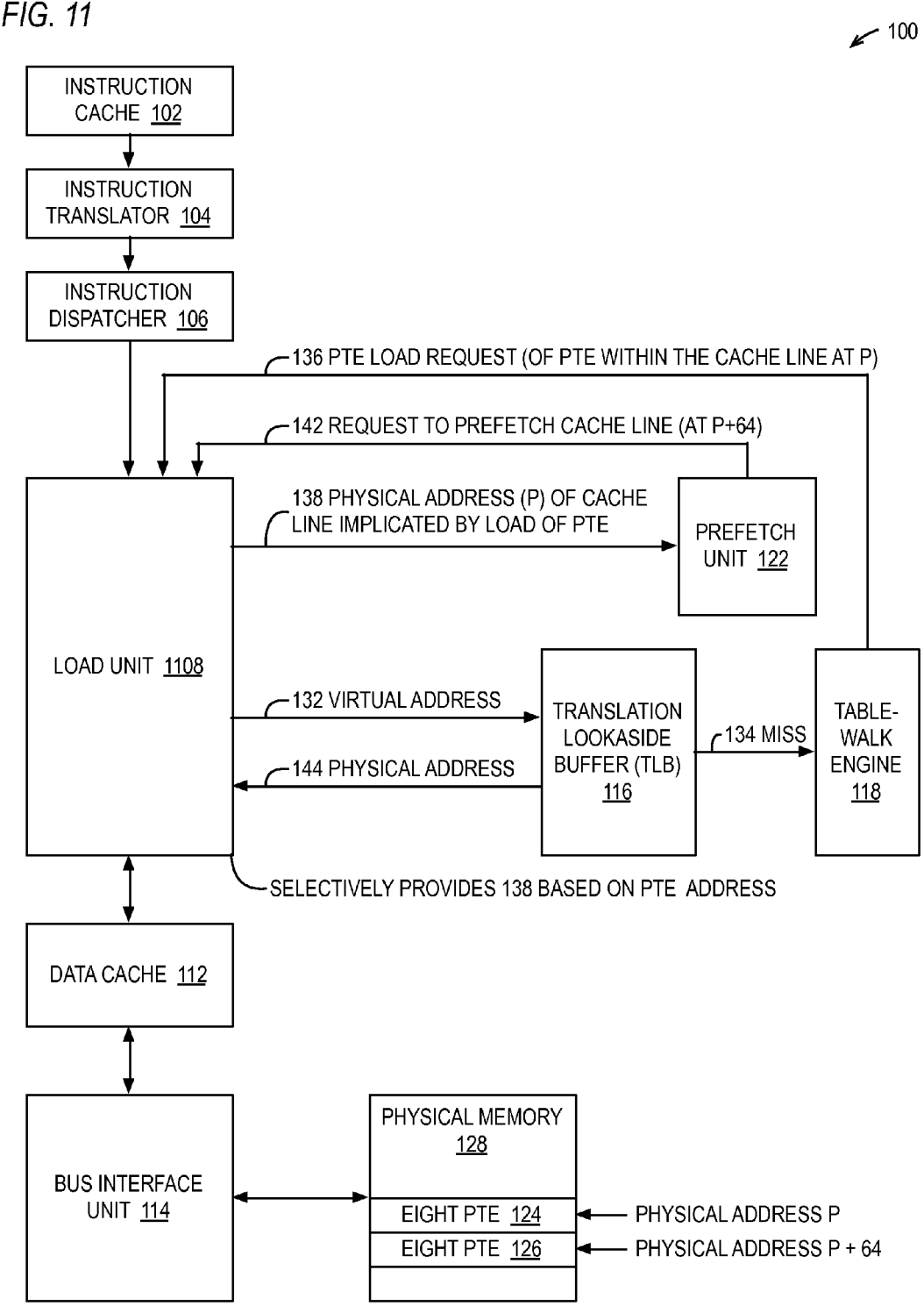
FIGS. 11 through 13 are block diagrams illustrating a microprocessor according to respective alternate embodiments.
Figure 12:
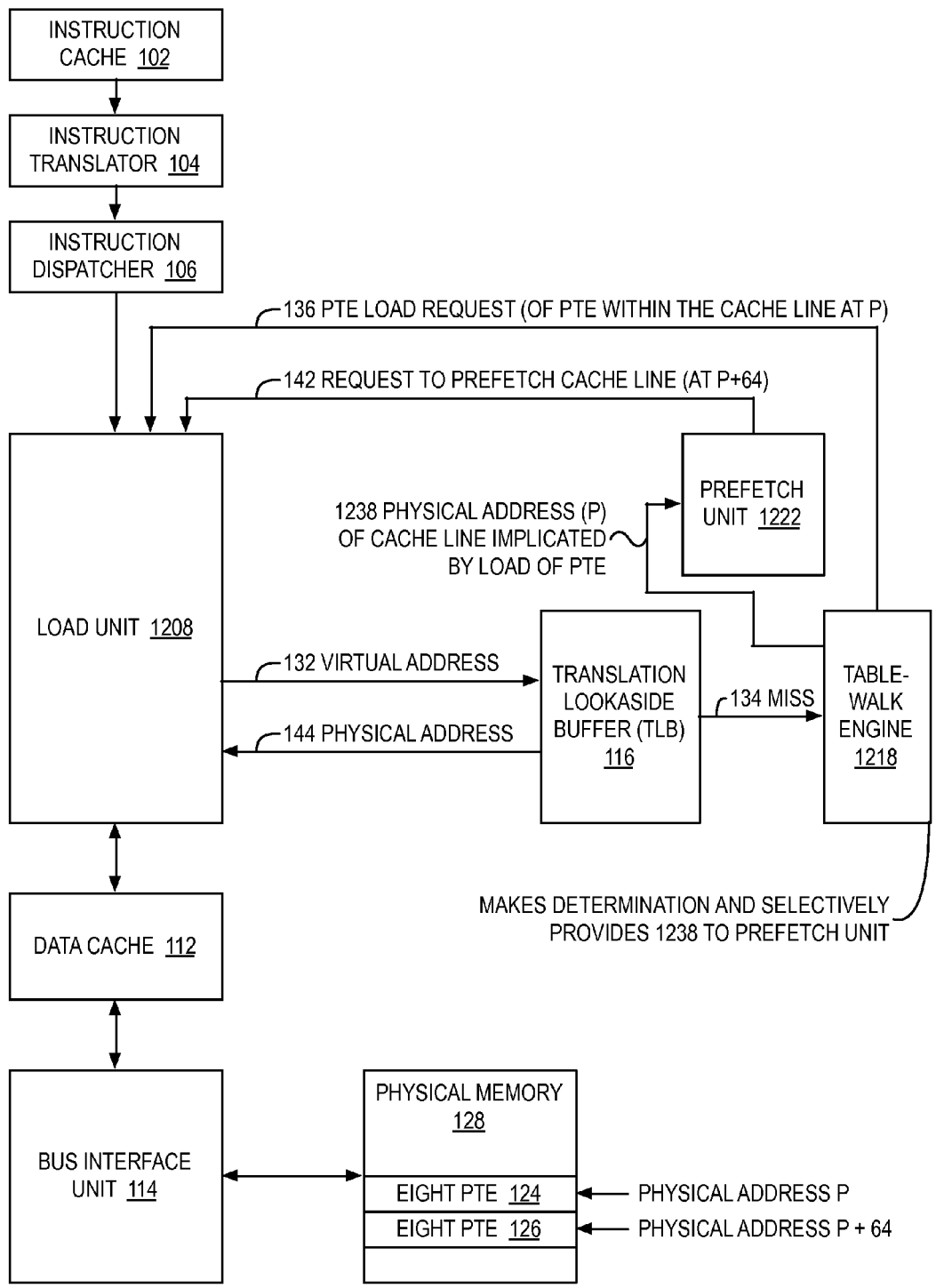
Figure 13:
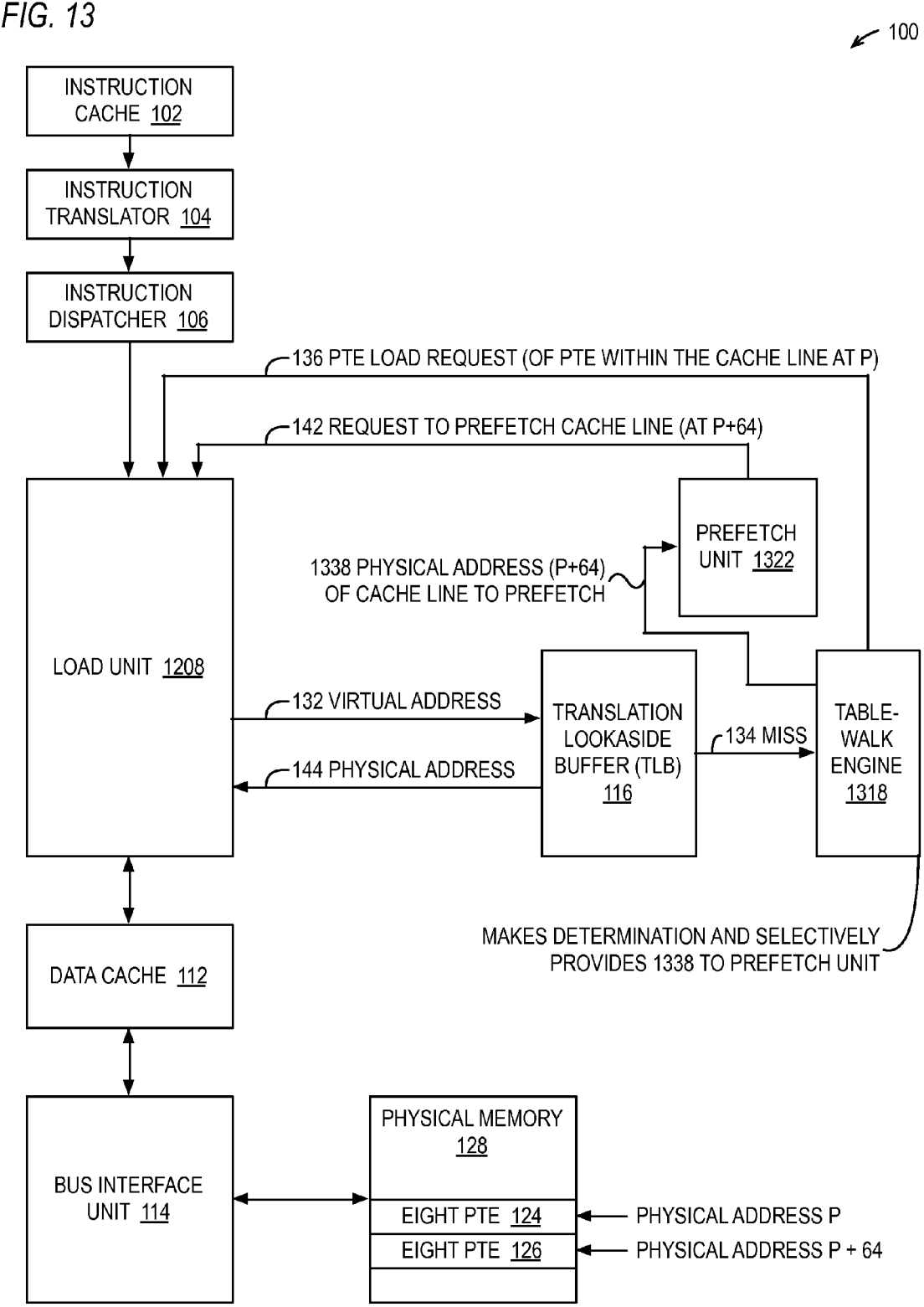

It should be understood that although FIGS. 7 through 10 describe the making of the determination with respect to the embodiment of block 404 of FIG. 4 (i.e., by the tablewalk engine 318 and for the setting of the last flag 396), the determination may be made by other units of the microprocessor 100 (e.g., by the load unit 1108 in the embodiment of FIG. 11), and for use in embodiments that do not employ the last flag 396 (e.g., embodiments of FIGS. 11 through 13). Preferably, the determination is made by hardware logic, e.g., combinatorial logic, within the relevant unit, e.g., tablewalk engine 318/1218/1318 or load unit 1108 that compares the appropriate bits of the virtual address 132 or PTE address 502 with the predetermined highest cache line index value.

Referring now to FIG. 11, a block diagram illustrating a microprocessor 100 according to an alternate embodiment is shown. The microprocessor 100 of FIG. 11 is similar in many respects to the microprocessor 100 of FIG. 1, and like-numbered elements are similar, unless otherwise noted. Differences in FIG. 11 from FIG. 1 are modifications to the load unit 1108. The load unit 1108 of FIG. 11 is modified to include hardware logic that makes the determination of whether the second cache line is outside the page table 508. Thus, in the embodiment of FIG. 11, the PTE load request 136 does not include a last flag 396. The microprocessor 100 of FIG. 11 operates similarly to the operation described with respect to FIG. 4, except that the tablewalk engine 118 does not make the determination (e.g., at block 404), and instead the load unit 1108 makes the determination (e.g., similar to the determination at block 416 after the tablewalk engine 118 sends the PTE request 136 at block 414) and does not provide the first cache line physical address 138 to the prefetch unit 122 if the determination is true.

Referring now to FIG. 12, a block diagram illustrating a microprocessor 100 according to an alternate embodiment is shown. The microprocessor 100 of FIG. 12 is similar in many respects to the microprocessor 100 of FIG. 11, and like-numbered elements are similar, unless otherwise noted. Differences in FIG. 12 from FIG. 11 are modifications to the tablewalk engine 1218, the load unit 1208 and the prefetch unit 1222. The load unit 1208 of FIG. 12 is modified such that it does not provide the first cache line physical address 138 to the prefetch unit 122. Instead, the tablewalk engine 1218 makes the determination and generates and provides the first cache line physical address 1238 directly to the prefetch unit 1222 if the determination is false. The microprocessor 100 of FIG. 12 operates similarly to the operation described with respect to FIG. 4, except that if the determination at block 406 is true, flow proceeds to block 418 (the prefetch of the second line is not performed); whereas, if the determination is false, flow proceeds to block 414 and then directly to a modified version of block 422 in which the tablewalk engine 1218 provides to the prefetch unit 1222 the first cache line physical address 1238.

Referring now to FIG. 13, a block diagram illustrating a microprocessor 100 according to an alternate embodiment is shown. The microprocessor 100 of FIG. 13 is similar in many respects to the microprocessor 100 of FIG. 12, and like-numbered elements are similar, unless otherwise noted. Differences in FIG. 13 from FIG. 12 are modifications to the tablewalk engine 1318 and the prefetch unit 1322. The tablewalk engine 1218 increments the first cache line physical address to generate the second cache line physical address 1338 (rather than the prefetch unit 1322 doing so) and provides it to the prefetch unit 1322 if the determination is false. The microprocessor 100 of FIG. 13 operates similarly to the operation described with respect to FIG. 4, except that if the determination at block 406 is true, flow proceeds to block 418 (the prefetch of the second line is not performed); whereas, if the determination is false, flow proceeds to block 414 and then directly to a modified version of block 422 in which the tablewalk engine 1218 provides to the prefetch unit 1322 the second cache line physical address 1338, and at a modified version of block 424 the prefetch unit 1322 does not need to perform the increment but instead simply uses the received second cache line physical address 1338 in its request 142 to the load unit 1208.

In yet another alternate embodiment (not shown), the load unit receives the PTE load request from the tablewalk engine and calculates the physical address of the second cache line and generates the prefetch request for the second cache line. In such an embodiment, the prefetch unit may be non-existent.

Although embodiments have been described in which the memory paging scheme uses terminology commonly used by x86 architecture processors, it should be understood that the embodiments are meant to encompass other processor architectures that include virtual memory capability and that employ page tables in their memory paging mechanisms, such as the SPARC Architecture, the ARM Architecture, the PowerPC Architecture, and other well-known processor architectures.

Furthermore, although embodiments have been described in which the second cache line is the next physically sequential cache line and a determination is made whether the second cache line is outside the page table by determining whether the first cache line is at the end of the page table, other embodiments are contemplated in which the second cache line is the previous physically sequential cache line and the determination is made by determining whether the first cache line is at the beginning of the page table, which accommodates the situation in which the program is proceeding through memory pages in the other direction.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A microprocessor, comprising:
a translation lookaside buffer;
a first request to load into the microprocessor a page table entry in response to a miss of a virtual address in the translation lookaside buffer, the requested page table entry is included in a page table, the page table encompasses a plurality of cache lines including a first cache line that includes the requested page table entry;
hardware logic that makes a determination whether a second cache line physically sequential to the first cache line is outside the page table;
a second request to prefetch the second cache line into the microprocessor, the second request is selectively generated based at least on the determination made by the hardware logic;
to make the determination of whether the second cache line is outside the page table, the hardware logic determines whether the first cache line is the last cache line encompassed by the page table; and
to determine whether the first cache line is the last cache line encompassed by the page table, the hardware logic determines whether predetermined bits of the virtual address all have a value of one.

2. The microprocessor of claim 1, further comprising:
the predetermined bits of the virtual address are upper M bits of N bits that determine an index of the page table entry within the page table, where N-M is $\log_2$ of a size in bytes of the page table entry.

3. The microprocessor of claim 1, further comprising:
the second request is generated when the determination false; and
the second request is not generated when the determination is true.

4. The microprocessor of claim 1, further comprising:
a load unit; and
a tablewalk engine that makes the first request to the load unit.

5. The microprocessor of claim 4, further comprising:
the first request includes a flag that indicates the determination made by the tablewalk engine;
a prefetch unit;
the load unit provides the physical address of the first cache line to the prefetch unit if the flag indicates the determination is false; and
the prefetch unit generates the second request in response to receiving the physical address of the first cache line from the load unit.

6. The microprocessor of claim 4, further comprising:
the load unit makes the determination;
a prefetch unit;
the load unit provides the physical address of the first cache line to the prefetch unit if the determination is false; and
the prefetch unit generates the second request in response to receiving the physical address of the first cache line from the load unit.

7. The microprocessor of claim 4, further comprising:
the tablewalk engine makes the determination;
a prefetch unit;
the tablewalk engine provides the physical address of the first cache line to the prefetch unit if the determination is false; and the prefetch unit generates the second request in response to receiving the physical address of the first cache line from the tablewalk engine.

8. The microprocessor of claim 4, further comprising:
the tablewalk engine makes the determination;
a prefetch unit;
the tablewalk engine provides the physical address of the second cache line to the prefetch unit if the determination is false; and
a prefetch unit generates the second request in response to receiving the physical address of the second cache line from the tablewalk engine.

9. The microprocessor of claim 4, further comprising:
the load unit makes the determination; and
the load unit generates the second request if the determination is false.

10. The microprocessor of claim 1, further comprising:
a cache memory; and
the second request comprises a request to prefetch the second cache line into the cache memory.

11. A method, comprising:
generating a first request to load into a microprocessor a page table entry in response to a miss of a virtual address in a translation lookaside buffer of the microprocessor, the requested page table entry is included in a page table, the page table encompasses a plurality of cache lines including a first cache line that includes the requested page table entry;
making a determination of whether a second cache line physically sequential to the first cache line is outside the page table;
selectively generating a second request to prefetch the second cache line into the microprocessor based at least on the determination;
said making the determination of whether the second cache line is outside the page table comprises determining whether the first cache line is the last cache line encompassed by the page table; and
said determining whether the first cache line is the last cache line encompassed by the page table comprises determining whether predetermined bits of the virtual address all have a value of one.

12. The method of claim 11, further comprising:
the predetermined bits of the virtual address are upper M bits of N bits that determine an index of the page table entry within the page table, where N-M is $\log_2$ of a size in bytes of the page table entry.

13. The method of claim 11, further comprising:
said selectively generating the second request comprises:
generating the second request when the determination false; and
not generating the second request when the determination is true.

14. The method of claim 11, further comprising:
the first request is made to a load unit of the microprocessor by a tablewalk engine of the microprocessor.

15. The method of claim 14, further comprising:
the first request includes a flag that indicates the determination made by the tablewalk engine;
providing, by the load unit, the physical address of the first cache line to a prefetch unit of the microprocessor if the flag indicates the determination is false; and
generating, by the prefetch unit, the second request in response to receiving the physical address of the first cache line from the load unit.

16. The method of claim 14, further comprising:
the determination is made by the load unit;
providing, by the load unit, the physical address of the first cache line to a prefetch unit of the microprocessor if the determination is false; and
generating, by the prefetch unit, the second request in response to receiving the physical address of the first cache line from the load unit.

17. The method of claim 14, further comprising:
the determination is made by the tablewalk engine;
providing, by the tablewalk engine, the physical address of the first cache line to a prefetch unit of the microprocessor if the determination is false; and
generating, by the prefetch unit, the second request in response to receiving the physical address of the first cache line from the tablewalk engine.

18. The method of claim 14, further comprising:
the determination is made by the tablewalk engine;
providing, by the tablewalk engine, the physical address of the second cache line to a prefetch unit of the microprocessor if the determination is false; and
generating, by the prefetch unit, the second request in response to receiving the physical address of the second cache line from the tablewalk engine.

19. The method of claim 14, further comprising:
the determination is made by the load unit; and
generating, by the load unit, the second request if the determination is false.

20. The method of claim 11, further comprising:
the second request comprises a request to prefetch the second cache line into a cache memory of the microprocessor.

21. A computer program product encoded in at least one non-transitory computer usable medium for use with a computing device, the computer program product comprising:
computer usable program code embodied in said medium, for specifying a microprocessor, the computer usable program code comprising:
first program code for specifying a translation lookaside buffer;
second program code for specifying a first request to load into the microprocessor a page table entry in response to a miss of a virtual address in the translation lookaside buffer, the requested page table entry is included in a page table, the page table encompasses a plurality of cache lines including a first cache line that includes the requested page table entry;
third program code for specifying hardware logic that makes a determination whether a second cache line physically sequential to the first cache line is outside the page table;
fourth program code for specifying a second request to prefetch the second cache line into the microprocessor, the second request is selectively generated based at least on the determination made by the hardware logic;
to make the determination of whether the second cache line is outside the page table, the hardware logic determines whether the first cache line is the last cache line encompassed by the page table; and
to determine whether the first cache line is the last cache line encompassed by the page table, the hardware logic determines whether predetermined bits of the virtual address ail have a value of one.

* * * * *